United States Patent [19]

Yoshimura et al.

[11] Patent Number: 5,073,179
[45] Date of Patent: Dec. 17, 1991

[54] METHOD FOR CONTROLLING FIBER DIAMETER DURING OPTICAL FIBER DRAWING PROCESS

[75] Inventors: Ichiro Yoshimura; Yasuo Matsuda; Yoshiki Chigusa, all of Yokohama, Japan

[73] Assignee: Sumitomo Electric Industries, Ltd., Osaka, Japan

[21] Appl. No.: 509,958

[22] Filed: Apr. 13, 1990

[30] Foreign Application Priority Data

Apr. 14, 1989 [JP] Japan .................................. 1-93217

[51] Int. Cl.$^5$ ..................... C03B 37/025; C03B 37/07
[52] U.S. Cl. ........................................... 65/2; 65/13; 65/29; 65/163
[58] Field of Search .................. 65/29, 3.43, 3.11, 13, 65/163, 2

[56] References Cited

U.S. PATENT DOCUMENTS 4,123,242 10/1978 Imoto et al. ............................ 65/13
4,280,827 7/1981 Murphy .
4,523,938 6/1985 Grego .

FOREIGN PATENT DOCUMENTS 2202830 9/1987 Japan ...................................... 65/2

OTHER PUBLICATIONS

Yasuo Suganuma, "Optical Fiber Producing Apparatus", Patent Abstracts of Japan, Jan. 1978, 10007 E 77.
Katsuyuki Imoto, "Device for Controlling Wire Diameter of...", Patent Abstracts of Japan, Apr. 1978, 1273 E 78.
Nobutaka Suzuki, "Preparation of Optical Fiber", Patent Abstracts of Japan, May 1987, 22 C 425.

*Primary Examiner*—Richard V. Fisher
*Assistant Examiner*—John Hoffmann
*Attorney, Agent, or Firm*—Cushman, Darby & Cushman

[57] ABSTRACT

There is provided a drawing process for producing an optical fiber which comprises drawing the optical fiber from a preform therefor under tension to form the optical fiber while heating and melting the preform, wherein an outer diameter of the optical fiber on which no coating has been provided is measured at a position at which shrinkage of the outer diameter of the optical fiber, while stretched, is not larger than 0.5% and drawing conditions are controlled based on the deviation of the measured diameter from a preselected outer diameter.

2 Claims, 1 Drawing Sheet

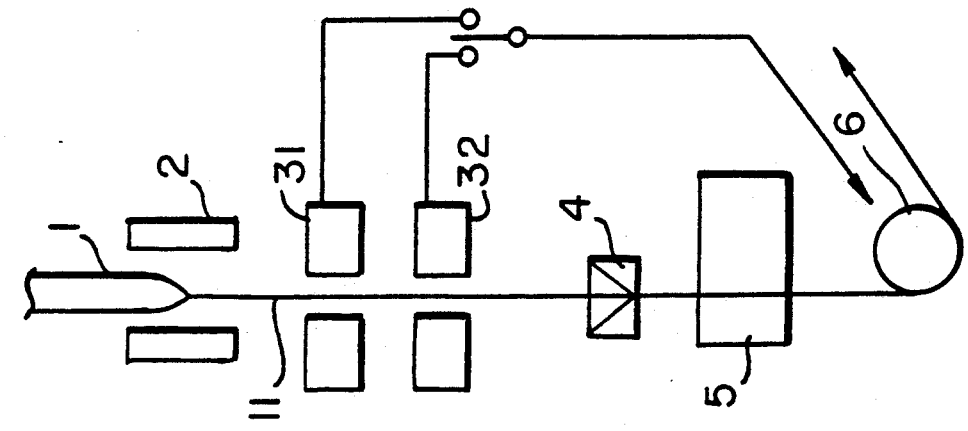
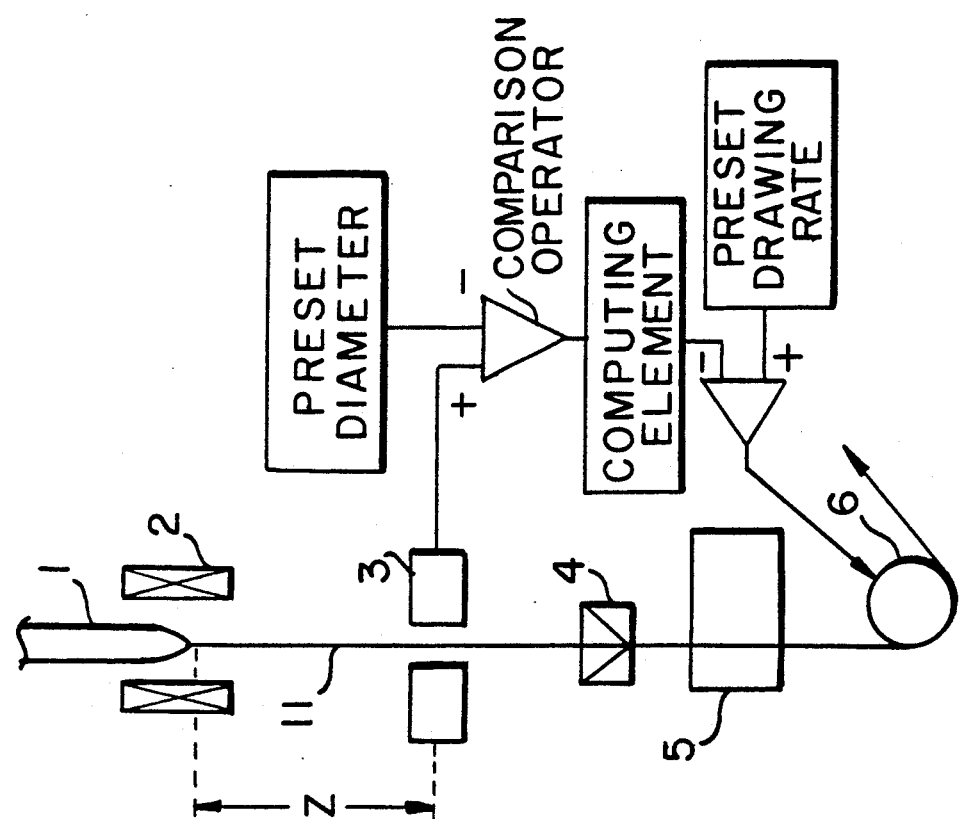
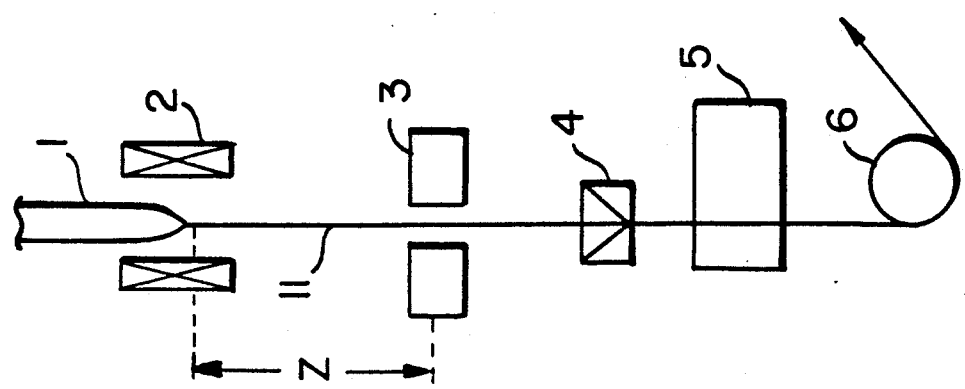

METHOD FOR CONTROLLING FIBER DIAMETER DURING OPTICAL FIBER DRAWING PROCESS

BACKGROUND OF THE INVENTION

1. Field of the Invention

The present invention relates to a process for optical fiber drawing.

2. Description of the Related Art

In a conventional drawing process for producing an optical fiber, the optical fiber is produced by heating and melting a preform for the optical fiber in a drawing furnace and drawing the fiber from the preform at a certain rate by a winding up device. The optical fiber which has just left the furnace and is remaining intact, that is, a so-called "bare fiber", tends to be considerably damaged and influenced with moisture. Therefore, the bare fiber is usually coated with an ultraviolet curable resin or a thermosetting resin in a resin coating device comprising, for example, a die, the resin is consequently cured in a resin curing device, and then the fiber is wound as a coated optical fiber. A diameter of the bare fiber is measured by a measuring device before the coating steps, whereby conditions during the drawing are controlled so that the outer diameter of the fiber is to be a preselected one.

A position at which the diameter measuring device is disposed has not been thought to be critical, and the device is usually located immediately below the drawing furnace as shown in Japanese Patent Kokai Publication No. 295260/1986.

If there is anything to limit the position of the measuring device, it has been that the measuring device should not be directly subjected to a strong radiation light from a lower portion of the furnace to avoid being heated to a remarkably high temperature.

In addition, it is preferred to locate the measuring device near the furnace in order to shorten the time lag and to increase a control gain when fluctuation in the diameter of the optical fiber has to be suppressed by controlling a drawing rate depending on an output signal from the measuring device.

Thus, in the conventional production of the optical fiber, usually a distance between the outer diameter measuring device and the coating die is longer than that between the drawing furnace and the measuring device, or a forced cooling device is disposed between the measuring device and the coating die in order to achieve a better resin coating.

In the conventional drawing process for producing the optical fiber, the drawing rate of the optical fiber was in the order of 100 m/min. Recently, the drawing rate is remarkably increased and it is reported that, in an experimental scale, a rate of 1000 m/min. has been realized. However, when such a high drawing rate is employed in the conventional process in which the measuring device is located immediately below the furnace, it has been found that the outer diameter of the finished optical fiber is extremely smaller than the diameter which is measured with the measuring device. As the requirements for accuracy in optical fiber diameter increase and the minimization of fluctuation in that diameter become critical as the result of the connection between fibers becoming better, development of a process which improves the accuracy of the outer diameter of the optical fiber is highly desired.

For example, the accuracy of the diameter of a quartz base optical fiber is usually required to be in $125 \mu m \pm 1 \mu m$. Taking account into an accuracy of the measuring device itself and the fluctuation in the diameter of the optical fiber during the production, a deviation of the measured diameter with the measuring device from a true diameter of the finished fiber should be not larger than 0.5% of the outer diameter of the finished fiber. Thus, it is desirable to develop a process which can achieve the deviation of 0.5% or less.

SUMMARY OF THE INVENTION

It is an object of the present invention to provide a drawing process for producing an optical fiber in which an improved accuracy of an absolute value of an optical fiber diameter is ensured and, especially, a deviation of a measured outer diameter with a diameter measuring device from a true diameter of a finished optical fiber can be smaller than that as obtained in the conventional process.

It is found that when the optical fiber is drawn with controlling conditions on the basis of an output signal from the measuring device for the outer diameter of the optical fiber, a position of the measuring device considerably affects the diameter of the finished optical fiber, and suitable control of the position minimizes the deviation though such positioning has not been noted in high speed drawing.

According to the present invention, there is provided a drawing process for producing an optical fiber which comprises drawing the optical fiber from a preform therefor under tension to form the optical fiber while heating and melting the preform, wherein an outer diameter of the optical fiber on which no coating has been provided is measured at a position at which shrinkage of the outer diameter of the optical fiber, while stretched, is not larger than 0.5% preferably 0.5 to 0.3% and drawing conditions are controlled with a deviation of a measured diameter from a preselected outer diameter.

As used herein, the term "shrinkage" is intended to mean a ratio of difference in diameters between the optical fiber at the measuring position and the optical fiber once it has finished shrinking.

In one preferred embodiment of the present invention, a temperature of the optical fiber at the measuring position of the outer diameter is lower than the glass softening point of the material of the optical fiber.

In another preferred embodiment of the present invention, a drawing rate (or linear velocity) from the preform is varied depending on the deviation in order to control the outer diameter of the optical fiber.

BRIEF DESCRIPTION OF THE DRAWINGS

FIG. 1 schematically shows one embodiment of the present invention,

FIG. 2 schematically shows another embodiment of the present invention, in which a deviation of an output signal with an outer diameter measuring device from a preselected value for a desired outer diameter is treated in an arithmetic unit and the drawing rate is controlled on line on the basis of results from the unit, and FIG. 3 schematically shows a further embodiment of the present invention, in which two measuring devices for the outer diameter of the optical fiber are provided for slow speed drawing and usual speed drawing, respectively.

DETAILED DESCRIPTION OF THE PREFERRED EMBODIMENTS

FIG. 1 shows one embodiment of the present invention, in which the numerical number 1 indicates the preform for the optical fiber, 2 does a drawing furnace, 3 does the outer diameter measuring device, 4 does a die for resin coating, 5 does a curing device for the resin and 6 does a winding up device for the optical fiber. The preform 1 which is heated and melted in the furnace 2 is stretched under tension to form the optical fiber 11, which is taken up by a spool (not shown) installed in the winding up device. In FIG. 1, Z is a distance from an outlet of the drawing furnace to the measuring device 3. Generally, an additional set of the coating die and the curing device is disposed between the curing device 5 and the winding up device 6. The present invention is characterized in that the outer diameter measuring device 3 is located at a position at which the shrinkage of the outer diameter of the optical fiber, while stretched, is not larger than 0.5%, preferably 0.5 to 0.3%. As a result, the position is shifted downward from the conventional position of the measuring device.

Generally, the outer diameter of the preform is gradually reduced in the furnace corresponding to an axial change of the preform temperature (therefore, a viscosity change of the preform material). Further, a size of the shrinking portion of the preform is dependent on the drawing rate, and the outer diameter of the preform and the preform temperature at the outlet of the furnace increase, as the rate increases. Of course, the outer diameter of the optical fiber depends on a preform diameter, structural factors of the drawing furnace such as a heating length, a size of the furnace outlet, and a flow rate and a kind of an inert gas. Thus, the present invention resides in not only limiting the distance between the outlet or a center of the drawing furnace and the measuring device for the outer diameter but also, as a whole, limiting such factors described above.

It is known that a temperature T (° C) of the optical fiber at a position which is Z (m) away from the outlet of the drawing furnace is estimated according to the following equation (I):

$$T = T_O + (T_S - T_O)\exp(-a \cdot Z/V_F) \qquad (I)$$

wherein $T_O$ is a room temperature (° C.), $T_S$ is a temperature (° C.) of an optical fiber immediately after leaving a furnace, Z (m) is a distance from an outlet of the furnace to a position at which an outer diameter of the optical fiber is measured, $V_F$ is a drawing rate (or linear velocity) (m/min.) and "a" is a constant determined with the diameter, a specific heat of the optical fiber and a thermal conductivity between the optical fiber and an atmosphere.

As seen from the above equation (I), the higher the linear velocity, that is, the larger $V_F$ is, the higher the temperature of the optical fiber when Z is fixed to a certain value.

With an apparatus comprising the devices as shown in FIG. 1 in which an stable operation up to 300 m/min. of the drawing rate can be carried out, the optical fiber was repeatedly produced with varying Z which is the distance from the shrinking part of the preform 1 to the outer diameter measuring device. During the production, the diameter of the optical fiber was measured by the measuring device and the diameter of the obtained optical fiber of which coating was stripped (that is, a true diameter of the optical fiber) was actually measured by a precise micrometer. Thus, it is found that, in the case of the drawing rate of 300 m/min., the difference between the measured diameter of the optical fiber with the measuring device and the true diameter of the optical fiber is less than 0.5%, when the optical fiber is cooled to below a temperature at which the shrinkage of the optical fiber diameter under tension, at the point where the outer diameter is measured with the measuring device, is 0.5% or less.

Thus, the position at which the measuring device is disposed is determined on the basis of the estimation of the fiber temperature according to the equation (I) and the several experiments as follows:

Firstly, the difference between the measured outer diameter and the true one is obtained with varying the position of the measuring device. Then, a relation between the difference and the measuring position is established. Finally, the position is determined at which the difference is less than 0.5%. Thus, the measuring device can be located at that position and an optical fiber having a better accuracy is produced.

A rough position near which the measuring device should be disposed can be determined with the tension during the production and physical properties on an elasticity or a viscosity of the fiber at a fiber temperature.

EXAMPLES

With an apparatus as shown in FIG. 1 in which an stable production at the velocity up to 300 m/min. can be carried out, an optical fiber was drawn with varying Z from 0.4 to 0.8 m and measured the true outer diameter of the produced fiber after stripping the coating. As the outer diameter measuring device at the measuring position, Laser Diameter Monitor 551 A commercially available from Anritsu Corporation was used. Other conditions were as follows:

| | |
|---|---|
| Outer diameter of preform | 25 mm |
| Drawing rate | 300 m/min. |
| Room temperature ($T_O$) | 25° C. |
| Fiber temperature immediately after leaving furnace ($T_S$) | 1600° C. |

When Z was 0.4 m, the measured outer diameter with the measuring device was 125.0 μm and the true outer diameter was 123.7 μm.

When Z was 0.8 m, the measured outer diameter with the measuring device was 125.0 μm and the true outer diameter was 124.9 μm. The fiber temperature at the measuring position was estimated to be about 900 ° C. according to the equation (I). It is seen that the optical fiber is under shrinking at the position of Z=0.4 m as employed in the conventional manner.

In the embodiment as shown in FIG. 1, it is contemplated to produce an optical fiber with a measured diameter of 126.3 μm at the outer diameter measuring position so as to produce the optical fiber with a diameter of 125 μm. But such conditions are not essential.

The results for other Z values are shown in Table:

TABLE

| | Measured outer diameter (μm) | | |
|---|---|---|---|
| Drawing rate | 100 m/min. | 200 m/min. | 300 m/min. |
| Z = 0.4 m | 125.1 | 125.2 | 126.1 |
| 0.5 m | 125.0 | 125.1 | 125.5 |
| 0.6 m | 125.0 | 125.1 | 125.2 |

TABLE-continued

| Drawing rate | Measured outer diameter (μm) | | |
| --- | --- | --- | --- |
| | 100 m/min. | 200 m/min. | 300 m/min. |
| True diameter | 125.0 | 125.0 | 125.0 |

It can be seen that the present invention is particularly effective in the drawing of the optical fiber at a drawing rate higher than 300 m/min.

Series of experiments as described above were repeated, and it is found that the optical fiber should be cooled to a temperature at which the shrinkage of the optical fiber under tension is not larger than 0.5% at a position where the outer diameter measuring device 3 is located when the drawing is carried out at a rate higher than 300 m/min.

Another embodiment of the present invention is shown in FIG. 2, in which the drawing rate is controlled with results from arithmetic operation (by, for example, a PID controller) on the deviation of the output signal of the measured outer diameter with the measuring device from the preset outer diameter.

A further embodiment of the present invention is shown in FIG. 3. In the embodiment as shown in FIG. 1, it takes time to detect the outer diameter of the fiber which is under increase in its diameter in the case of small drawing rate, whereby a time lag arises in the control. In the embodiment as shown in FIG. 3, when the drawing rate is small, detection of the outer diameter is carried out with the measuring device 31 and when the rate is increased, the detection is carried out with the measuring device 32. Alternatively, only one measuring device is used which can move along the optical fiber depending on the drawing rate.

Further, a forced cooling device for the optical fiber is provided between the furnace 2 and the outer diameter measuring device 3, whereby the distance between them can be shortened. In this embodiment, the diameter of the optical fiber is also measured at a position at which the shrinkage of the outer diameter is not larger than 0.5%. When the drawing rate is largely exceeds 300 m/min., such a construction is especially preferred since large scaling of the apparatus can be avoided and a prompt response can be obtained.

As described above, according to the present invention, the absolute value of the outer diameter of the optical fiber which has been shrunk is measured correctly, whereby the optical fiber with better accuracy in its size is produced.

What is claimed is:

1. A drawing process for producing an optical fiber comprising the steps of;
   heating an melting a preform for an optical fiber;
   while heating and melting, drawing the optical fiber from the preform under tension to form the optical fiber; and
   measuring an outer diameter of the optical fiber as it is being drawn at a position at which shrinkage of the outer diameter of the optical fiber is not larger than 0.5% , the drawing being carried out at a drawing rate that is controlled based on a deviation of the measured diameter from a preselected outer diameter.

2. The process according to claim 1, wherein a temperature of the optical fiber at the measuring position is lower than a glass softening point of a material of the optical fiber.

* * * * *